United States Patent [19]

Eisert

[11] 4,010,588
[45] Mar. 8, 1977

[54] SEALING DEVICE

[75] Inventor: Gerald A. Eisert, Hastings, Minn.

[73] Assignee: Central Research Laboratories, Inc., Red Wing, Minn.

[22] Filed: Oct. 19, 1973

[21] Appl. No.: 408,189

[52] U.S. Cl. .................... 52/398; 49/488; 128/1 B; 312/1
[51] Int. Cl.[2] ...................... A61G 11/00
[58] Field of Search ............ 52/400, 397, 616; 49/488, 489, 495; 128/1 B; 312/1

[56] References Cited

UNITED STATES PATENTS

| 2,598,532 | 5/1952 | Gibbon | 128/1 B |
|---|---|---|---|
| 2,600,240 | 6/1952 | Grieb | 128/1 B |
| 2,695,605 | 11/1954 | Gibbon | 128/1 B |
| 2,706,931 | 4/1955 | Morgenstern | 52/400 |
| 3,051,164 | 8/1962 | Trexler | 128/1 B |
| 3,084,684 | 4/1963 | Saunders | 128/1 B |
| 3,221,456 | 12/1965 | Capel | 52/400 |
| 3,267,614 | 4/1966 | Cazalis | 49/488 |

FOREIGN PATENTS OR APPLICATIONS

| 764,728 | 8/1967 | Canada | 49/489 |
|---|---|---|---|
| 6,404,885 | 11/1964 | Netherlands | 48/489 |

Primary Examiner—Price C. Faw, Jr.
Assistant Examiner—Henry Raduazo
Attorney, Agent, or Firm—Burd, Braddock & Bartz

[57] ABSTRACT

A device for sealing detachable components, such as gloves, windows or closure plugs, in the ports of rigid walled chambers, such as glove boxes. The sealing device permits displacement and replacement of a detachable component in place in such a port without breaking the seal to expose the interior of the chamber to the outside atmosphere, or vice versa. The sealing device is characterized by a hand hole bushing disposed in the port and secured to the chamber wall to define a passageway having a continuous sealing surface and a continuous adjacent groove for retaining a detachable component within the bushing. The detachable component is characterized by a deformable semi-rigid bead adapted to be snapped into the continuous groove of the bushing and a continuous channel holding an O-ring sealing element which engages the sealing surface of the bushing. The detachable component may be glove supported on a ring adapted to engage the cuff of the glove to permit work to be done within the chamber, or it may be a plug to simply close a port or it may be a window for viewing the inside of the chamber. The relation of the bushing and detachable component is such that, when a replacement component is to be installed, the detachable component to be replaced is forced inwardly into the chamber, maintaining sealing engagement with the bushing until the replacement component has entered into sealing engagement with the bushing.

4 Claims, 5 Drawing Figures

SEALING DEVICE

This invention relates to a sealing device for joining any one of several detachable components to a port in the rigid wall of a chamber whose interior is desired to be sealed off from the surrounding environment. Such leak-proof rigid walled chambers are commonly referred to as "glove boxes." They are generally transparent so as to be viewed from the outside. They are provided with a plurality of ports in each of which a glove is secured such that a technician may insert his hands through the ports into the gloves and perform manipulative operations within the box. The gloves are secured in sealed relation to protect the technician and/or the contents of the chamber. In some instances, extra ports may be provided and it is desired simply to seal these off. In some instances, the chamber walls may not be transparent, in which case other ports may be provided which contain viewing windows.

This type of chamber may be used for the handling of various noxious or hazardous materials, radioactive objects, and the like. Leak-tightness is essential. While this may be achieved relatively easily in a one-time installation, it is extremely difficult to replace parts, such as to replace a glove, without loss of integrity of the seal of the chamber environment and danger of escape of hazardous substances from the chamber and exposure of workmen.

One solution to the disadvantages of prior methods of securing detachable components, such as gloves, in the walls of such chambers, has been proposed by U.S. Pat. No. 3,267,614. That patent discloses an interchangeable sealing device for joining a detachable component to a rigid wall. The device of that patent includes a hand hole bushing fixed in a port in the rigid wall and a semi-rigid internal sleeve for the purpose of securely fastening detachable components, such as gloves, in the interior of that bushing. The sealing device of that patent is characterized by a beaded edge on the semi-rigid sleeve engageable with a channel in the hand hole bushing for the purpose of immobilizing the sleeve and a sealing ring joint having at least two lips which are applied simultaneously against the internal sleeve and against the internal wall of the bushing. Sealing is accomplished by a specially formed sealing ring having a plurality of lips and fitted into a continuous channel in the outer perimeter of the flexible internal sleeve adjacent the immobilizing bead.

While this system permits replacement of detachable components, such as gloves or viewing windows or the like, it likewise presents a number of drawbacks. If the detachable component is a glove, that glove must either be especially made with the particular lipped ring on its cuff, or the conventional bead of an ordinary commercially available glove must be removed and replaced with a lipped ring. In the latter case, great care must be exercised to insure the integrity of the seal between the glove and the newly added lipped ring. Because of the intricated structure of the lipped ring, great care must be exercised in assembling the sealing device. If the sealing ring is not perfectly seated in the channel surrounding the internal sleeve, one of the inner lips may be deformed such that a point of leakage exists. Similarly, because of the relatively tenuous engagement between the lips of the sealing ring and the inside sealing surface of the bushing, slight lateral stress on the glove by the technician performing work using the glove may deform the lip sufficient to break the seal.

The present invention is directed toward overcoming the disadvantages of the sealing device of U.S. Pat. No. 3,267,614 while retaining the ease of replacement of detachable components and similar means of immobilization.

The invention is illustrated in the accompanying drawings in which corresponding parts are identified by the same numerals and in which.

Figure 1:
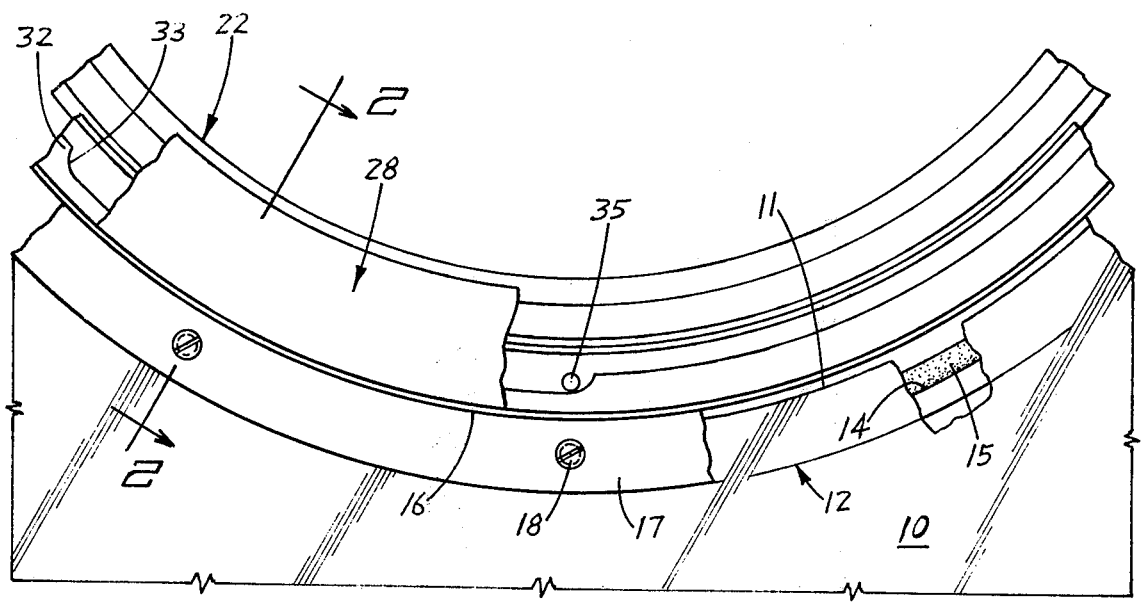
FIG. 1 is a fragmentary front elevation, shown with parts broken away, of a sealing device according to the present invention installed in a port in a rigid wall of a glove box or similar chamber.
Figure 2:
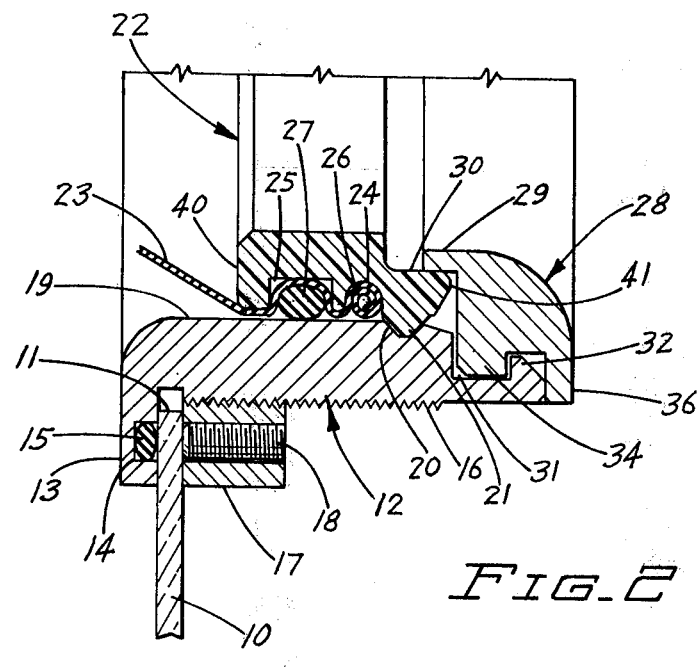
FIG. 2 is a section on line 2—2 of FIG. 1 and in the direction of the arrows showing a sealing device in which the detachable component includes a glove.

Referring now to the drawings, and particularly FIGS. 1 and 2, there is shown in fragmentary form a rigid wall 10 forming part of a chamber desired to be maintained in leak-proof condition such that its environment is separate from the surrounding environment. Wall 10 includes a circular port 11 in which is positioned a bushing, indicated generally at 12. Bushing 12 is of diameter slightly less than that of port 11 so that it will fit easily therein and has an outwardly extending flange 13. One surface of flange 13 is provided with an annular groove or channel 14 in which is seated a resilient O-ring 15 of rubber or synthetic elastomeric material.

Bushing 12, desirably formed from stainless steel or similar rigid durable material, is inserted through wall 10 from the inside (or left side, as viewed in the drawings) prior to final assembly of the chamber. Bushing 12 is externally threaded at 16 to receive a ring nut 17 which forces flange 13 into tight engagement with the surface of wall 10 surrounding port 11 compressing O-ring 15 to make a tight seal. A plurality of set screws 18 extending through ring nut 17 clamp the flange in place.

The inner surface of bushing 12 which defines a hand hole or passageway is provided with a smooth sealing surface 19 of flat profile. Adjacent to and upstream from the sealing surface, bushing 12 is provided with a continuous groove 20 adapted to receive an annular peripheral bead 21 forming part of an internal sleeve or support ring, indicated generally at 22, which together with a glove 23 comprises one form of detachable component. The central opening of ring 22 provides a passage for insertion of a hand and arm into the glove. Support ring 22 is formed from a semi-rigid deformable material having good elastic memory properties, such as high-density polyethylene, such that it may be snapped into place with bead 21 engaging groove 20 to immobilize the ring and glove carried by it in bushing 12, the outer periphery of bead 21 being of greater diameter than the inner periphery of the bushing.

The outer perimeter of support ring 22 is provided with a first channel or groove 24 adjacent to but downstream from bead 21 and a second groove or channel 25 spaced from the first. Channel 24 performs two functions. It serves to receive the conventional bead 26 of a glove 23 to facilitate initial mounting of the glove on the support ring and to aid in preventing accidental dislodgement of the glove after the sealing device is assembled. As seen by reference to FIG. 3, and explained in greater detail hereinafter, channel 24 also facilitates flexing of bead 21 and slight inner rotation of the bead to facilitate initial placement of the support ring in the bushing, and subsequent displacement and replacement.

Channel 25 functions to seat a resilient O-ring 27 which likewise performs two functions. O-ring 27 is formed from resilient rubber or synthetic elastomeric material. Because glove 23 is positioned on support ring 22 prior to O-ring 27, when the O-ring is positioned in the channel it deforms the flexible glove wall into a liner for the channel. The O-ring thus functions to help secure the glove in place on the supporting ring 22. More importantly, however, O-ring 27 performs the primary sealing function of the device by virtue of being compressed into tight sealing engagement with sealing surface 19 of bushing 12 and forcing the inner surface of the glove into tight sealing relation with the bottom of channel 25.

It is apparent that the cuff of glove 23 is securely locked against dislodgment from the support ring when the support ring is mounted in the bushing, as a result of any pulling or tugging force exerted on the glove. It will be noted that the bead 26 of the glove does not perform any sealing function. In lieu of a glove, other flexible closed-end tubular members, such as flexible bellows or bags, may be mounted on the support ring in sealing relation with the bushing in the same manner.

In order to prevent accidental dislodgment of the deformable semi-rigid support ring 22 from bushing 12, and consequent disruption of the integrity of the seal of the chamber to which the bushing provides access, a rigid retaining ring, indicated generally at 28, is preferably additionally provided. Retaining ring 28, formed for example of polyvinyl chloride or the like, fits into and is secured in the upstream end of bushing 12. The retaining ring has a forwardly projecting lip 29 which extends partially over shoulder 30 of support ring at overlying bead 21. The inside diameter of the support ring at shoulder 30 is somewhat greater than the inside hand hole diameter of the support ring. Lip 29 prevents flexing or rotation of the head and effectively prevents accidental dislodgement of the bead from bushing groove 20 with consequent possible dislodgement of the support ring and breaking of the seal maintained thereby.

In order to secure the retaining ring 28, bushing 12 is provided with an inner peripheral channel 31. A plurality of spaced apart inwardly extending flanges 32 partially overlie channel 31. The open spaces 33 between adjacent sections of flange 32 correspond in number and relative location around the periphery of bushing 12 to a plurality of outwardly projecting tongues or teeth 34 on the perimeter of retaining ring 28. The retaining ring is thus positioned at the upstream end of bushing 12 with tongues or teeth 34 overlying openings 33 between flanges 32. The retaining ring is then pushed forward until the tongues 34 seat in channel 31, after which the retaining ring is rotated a fractional turn until the retaining ring is retained by virtue of flanges 32 overlying tongues 34 in a bayonet-type joint. Preferably a stop in the form of pin 35 is provided to positively position the retaining ring in locked position in the bushing.

Retaining ring 28 is also preferably provided with an outwardly and downwardly extending lip 36 which overlies the outer end of bushing 12. The inner surface of retaining ring 28 is desirably arcuate an smooth, merging with the outer surfaces of lips 29 and 36 to provide a smooth easy obstruction-free entry into the glove 23 or other tubular element held by the support ring, in addition to its safety function. Channel 31 likewise performs a dual function in that, as seen in FIG. 3, a bayonet-type connection can likewise be made with an ejection tool 37 fitted with tongues or teeth 38 in the same type of bayonet joint connection as the retaining ring.

Figure 3:
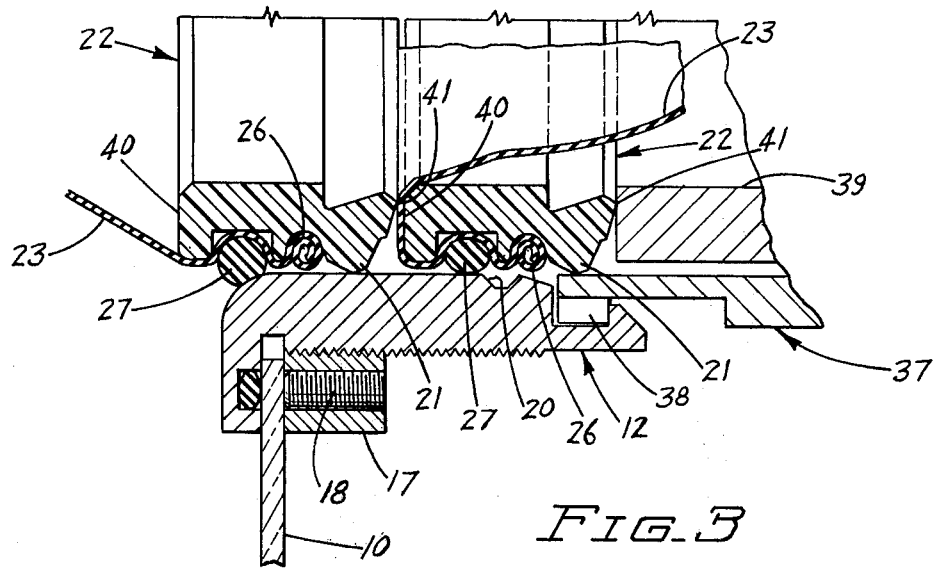
FIG. 3 is a similar sectional view showing the manner in which one detachable component is displaced and replaced by another.

The manner in which one detachable component is displaced and replaced by another without breaking the seal is shown in FIG. 3. The retaining ring 28 is first removed from the bushing 12. A second support ring 22 is prepared by mounting a glove 23 on it with the bead 26 of the glove cuff positioned in groove 24 around the perimeter of the support ring and with O-ring 27 positioned in channel 25. In order to get the glove 23 out of the way during the replacement operation, glove 23 is then partially reversed and pulled through the support ring, as shown. The newly prepared support ring is then positioned within the jaw of the ejection ring 39 of the ejection tool 37 of known type, as described in U.S. Pat. No. 3,267,614, by deforming the support ring slightly by flexing and rotating bead 21 inwardly to reduce the maximum diameter of the support ring to approximately the inside diameter of bushing 12. The ejection tool 37 is then locked into bushing 12 by inserting tongues 37 through the spaces 33 and rotating the tongues in the locking channel 31 of the bushing.

Then, the plunger-like ejection ring 39, which is movable relative to the locked-in frame of the ejection tool, is moved forwardly to push the newly prepared support ring into the bushing. As the forward or inner face 40 of the replacement support ring (now covered by one layer of glove 23) bears against the rearward or outer face 41 of the support ring in place, the ring is flexed and bead 21 is rotated inwardly and out of groove 20 in the bushing. As this occurs, O-ring 27 of the support ring being displaced maintains the integrity of the seal.

The width of the sealing surface 19 of the bushing is approximately the same as the overall height of support ring 22. Thus, as the replacement support ring is gradually and uniformly pushed forward into the bushing and the original support ring is being pushed out, the O-ring 27 of the first ring maintains sealing contact until the replacement support ring is pushed far enough into the bushing that the sealing O-ring 27 of the second support ring establishes sealing contact with surface 19. This is the position of the elements shown in FIG. 3. Then, as the replacement support ring is pushed farther, the seal maintained by the O-ring of the first support ring is broken and the displaced support ring falls into the chamber. In the meantime, the immobilizing bead 21 of the replacement support ring snaps into groove 20 in the bushing to hold the new support ring in place. The ejection tool is removed and the retaining ring 28 is replaced. The glove retained by the support ring is pushed through the ring into the chamber and is ready for resumption of the work to be performed within the chamber.

Figures 4, 5:
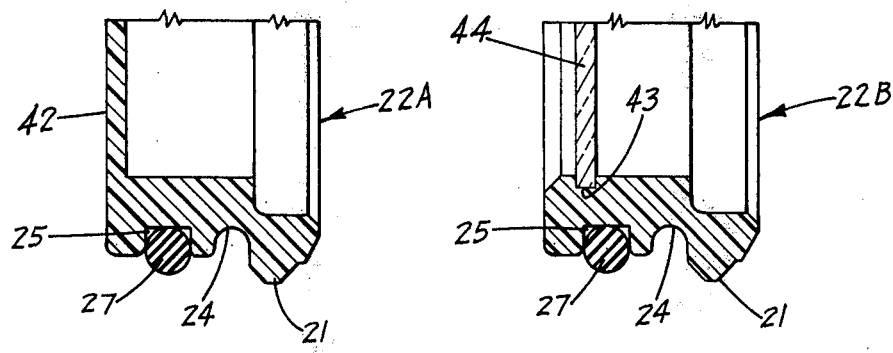
FIG. 4 is a sectional view of a modified form of detachable component used as a simple plug or closure.
FIG. 5 is a sectional view of a further modified form of detachable component used as a viewing window.

In FIG. 4, there is shown a modified form of detachable component which may be used in establishing a seal in a port in a rigid wall according to the present invention. This component is comprised of a support ring 22A whose structure is generally as already described including bead 21, groove 24 and channel 25 with sealing O-ring 27 seated therein. However, instead of having a central opening or hand hole, this form of detachable component has an integral leak-proof front wall 42. The component may thus be used as a sealed leak-proof closure for any port into the chamber which is not needed at any particular time. If it is desired to replace such a closure component with a glove, for example, the procedure is as already described in connection with the description of FIG. 3.

In FIG. 5, there is shown a further modified form of detachable component comprising a support ring 22B whose structure is likewise as generally described in connection with support ring 22. However, the inner wall of this modified form of support ring is provided with a continuous channel 43 into which is fit a circular insert 44 of transparent leak-proof material such as glass, methylmethacrylate, or the like. The transparent insert 44 is set into place by expanding the deformable support ring sufficient to slide the insert pane into channel 43 and then releasing the expanding force to permit the support ring to contract around the transparent pane and establishing a good seal between the ring and pane in the channel. As an added precaution, channel 43 may be made somewhat deeper so that a sealing O-ring may be inserted into the channel before insertion of the transparent pane. This modified form of detachable component may be used, for example, in those instances where the rigid chamber wall be non-transparent or otherwise where an unused port may be present through which visibility is desirable. The window component may likewise be installed or displaced in the manner already described.

It is apparent many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A sealing device for joining a detachable component to a rigid wall, said device comprising:
    A. a hand hole bushing having a forward edge and a rearward edge and adapted to be fixedly and sealedly secured within an opening in a rigid wall and having a passageway therethrough, said bushing including:
        1. a continuous sealing surface extending around the perimeter of said passageway, and
        2. a continuous groove adjacent said sealing surface, between said sealing surface and the rearward edge of said bushing; and
    B. a detachable component adapted to be mounted in said passageway, said detachable component including:
        1. an annular support ring having
            a. an outwardly extending, deformable semi-rigid bead adjacent the rearward edge thereof adapted to be disposed in the continuous groove of said bushing to securely and detachably immobilize said support ring within said passageway,
            b. a continuous channel spaced from said bead and extending around the outer periphery of said support ring,
            c. a further continuous groove extending around the outer perimeter of the support ring adjacent to said bead in the space between said bead and channel to facilitate deformation of said semi-rigid bead, and
            d. a deformable sealing ring of circular cross-section seated in said channel and extending beyond said channel, the outside periphery of said sealing ring being of greater diameter than the periphery of said continuous sealing surface of said passageway, and
        2. leak-proof means for preventing the passage of undesired material through the central opening of the support ring, said leak-proof means including a glove of flexible and leak-proof material, said glove having a beaded cuff,
            a. the cuff of said glove being stretched over the outer periphery of said support ring,
            b. the bead on the cuff of said glove being disposed in said further continuous groove, and
            c. a portion of said cuff underlying said sealing ring in said channel.

2. A sealing device according to claim 1 further characterized in that the width of said continuous sealing surface equals at least about the maximum height of said support ring.

3. A sealing device for joining a detachable component to a rigid wall, said device comprising:
    A. a hand hole bushing having a forward edge and a rearward edge and adapted to be fixedly and sealedly secured within an opening in a rigid wall and having a passageway therethrough, said bushing including:
        1. a continuous sealing surface extending around the perimeter of said passageway, and
        2. a continuous groove adjacent said sealing surface, between said sealing surface and the rearward edge of said bushing; and
    B. a detachable component adapted to be mounted in said passageway, said detachable component including:
        1. an annular support ring having
            a. an outwardly extending, deformable semi-rigid bead adjacent the rearward edge thereof adapted to be disposed in the continuous groove of said bushing to securely and detachably immobilize said support ring within said passageway,
            b. a continuous channel spaced from said bead and extending around the outer periphery of said support ring, and
            c. a deformable sealing ring of circular cross-section seated in said channel and extending beyond said channel, the outside periphery of said sealing ring being of greater diameter than the periphery of said continuous sealing surface of said passageway, and
        2. leak-proof means for preventing the passage of undesired material through the central opening of the support ring, and
    C. a retaining ring detachably secured to the rearward edge of said bushing, said retaining ring having a forwardly projecting lip overlying the inner periphery of said support ring adjacent the rearward edge thereof.

4. A sealing device according to claim 3 further characterized in that:
A. the inner periphery of said support ring adjacent the rearward edge thereof is of greater diameter than the remainder of said inner periphery to form a shoulder adjacent said rearward edge, and
B. said retaining ring lip engages overlies said shoulder.

* * * * *

UNITED STATES PATENT AND TRADEMARK OFFICE
CERTIFICATE OF CORRECTION

PATENT NO. : 4,010,588
DATED : March 8, 1977
INVENTOR(S) : Gerald A. Eisert

It is certified that error appears in the above-identified patent and that said Letters Patent are hereby corrected as shown below:

Column 3, line 48, "head" should be --bead--.

Column 4, line 6, "an" should be --and--.

Signed and Sealed this

Seventeenth Day of May 1977

[SEAL]

*Attest:*

RUTH C. MASON
*Attesting Officer*

C. MARSHALL DANN
*Commissioner of Patents and Trademarks*